United States Patent
Liu et al.

(10) Patent No.: US 10,704,998 B2
(45) Date of Patent: Jul. 7, 2020

(54) ROCK MECHANICS RESPONSE TEST SYSTEM FOR SIMULATED COMPLEX DEEP EARTH ENVIRONMENT

(71) Applicant: Sichuan University, Chengdu (CN)

(72) Inventors: Jianfeng Liu, Chengdu (CN); Heping Xie, Chengdu (CN); Huining Xu, Chengdu (CN); Jianliang Pei, Chengdu (CN); Chunping Wang, Chengdu (CN); Jianhui Deng, Chengdu (CN); Wenxi Fu, Chengdu (CN); Lu Wang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 16/396,784

(22) Filed: Apr. 29, 2019

(65) Prior Publication Data

US 2019/0331570 A1    Oct. 31, 2019

(30) Foreign Application Priority Data

Apr. 28, 2018 (CN) .......................... 2018 1 0403497

(51) Int. Cl.
  *G01N 3/18* (2006.01)
  *G01N 3/12* (2006.01)
  *G05B 9/02* (2006.01)

(52) U.S. Cl.
  CPC ................. *G01N 3/12* (2013.01); *G05B 9/02* (2013.01); *G01N 2203/0048* (2013.01); *G01N 2203/0226* (2013.01); *G01N 2203/0232* (2013.01); *G01N 2203/0256* (2013.01)

(58) Field of Classification Search
  CPC ............. G01N 3/12; G01N 2203/0226; G01N 2203/0048; G01N 2203/0232; G01N 2203/0256; G01N 3/18; G01N 3/062; G01N 2203/0605; G01N 3/08; G05B 9/02; F16C 17/04; F16C 19/522; F16C 2370/00
  See application file for complete search history.

(56) References Cited

U.S. PATENT DOCUMENTS

| | | | | | |
|---|---|---|---|---|---|
| 5,226,310 | A | * | 7/1993 | Steiger | E21B 49/006 73/38 |
| 7,143,653 | B2 | * | 12/2006 | Abdel-Hadi | G01N 3/10 73/819 |
| 9,557,315 | B2 | * | 1/2017 | Kats | G01N 33/383 |
| 2019/0187039 | A1 | * | 6/2019 | Su | G01N 15/082 15/82 |

* cited by examiner

*Primary Examiner* — Brandi N Hopkins
(74) *Attorney, Agent, or Firm* — Bayramoglu Law Offices LLC

(57) ABSTRACT

The invention belongs to the field of rock mechanics test of engineering rock masses and is intended to address the safety and alignment challenges of a rock mechanics test response system for existing simulated complex deep earth environment. A rock mechanics test response system for a simulated complex deep earth environment includes a bearing system for rock mechanics tests in simulated deep earth environment and an MTS triaxial sensor aligning and mounting device arranged on the bearing system for rock mechanics tests in simulated deep earth environment. The invention improves installation and dismounting efficiency of an MTS triaxial force sensor, enhances reliability of lifting and solves the problem of aligning holes during installation of the force sensor, thus improving the installation efficiency.

8 Claims, 6 Drawing Sheets

ROCK MECHANICS RESPONSE TEST SYSTEM FOR SIMULATED COMPLEX DEEP EARTH ENVIRONMENT

CROSS REFERENCE TO RELATED APPLICATIONS

This application is based upon and claims priority to Chinese Patent Application No. 201810403497.X, filed on Apr. 28, 2018 the entire contents of which are incorporated herein by reference.

TECHNICAL FIELD

The invention belongs to the field of rock mechanics test of engineering rock masses and is intended to address the safety and alignment challenges of high temperature and high pressure force sensors in a rock mechanics test response system for existing simulated complex deep earth environment.

BACKGROUND

Deep engineering rock masses are in a complex stress state and environment including high temperature, high pressure, high seepage and dynamic load. For deep earth engineering construction, mechanical properties of the engineering rock masses in deep earth environment are necessary to provide basis and fundamental data for deep earth engineering construction and safe operation. A deep earth engineering rock mechanics test is thus of great importance. The key of deep earth engineering rock mechanics tests depends on a rock mechanics test machine with high performance. At present, the MTS rock mechanics test system manufactured by US MTS is one of the most advanced and most commonly used rock mechanics test equipment in the world. The system has a high temperature and high pressure feature and is capable of testing mechanical properties and damage behaviors of engineering rock masses in deep earth environment. In the system, a high temperature and high pressure force sensor is a core component for measurement and control. The high temperature and high pressure force sensor has to be tested, maintained and replaced regularly to conduct rock mechanics tests at high temperature and high pressure. The high temperature and high pressure force sensor is disposed in a cavity of a high temperature and high pressure chamber with a narrow space, and the force sensor is arranged on a high temperature and high pressure base disposed with a series of leads for high temperature and high pressure load, deformation, temperature, hydraulic, seepage and ultrasound. As the high temperature and high pressure force sensor is rather heavy, the sensor can only be lifted by three personnel in dismounting and installation. Due to a narrow space that cannot be observed visually, the cavity to be dismounted or installed is inaccessible by hand, so that operations are extremely tough. Closed extrusion between an O-shaped seal ring at the top of a connecting bolt and a connecting hole makes it impossible to determine the removal state of the bolt at disassembly. Due to unstable suction force between the force sensor and an upper rigid column, the sensor may fall suddenly during disassembly. Due to a complicated connection structure between the force sensor and the upper rigid column, the installation process is very slow and lasts for a long time to ensure alignment to a central threaded hole and a boundary limiting pin hole synchronously during connection. Unstable lifting or loss of the suction force may result in falling of the sensor on the base of a triaxial chamber or further falling on the ground from the base of the triaxial chamber or an oil cylinder, thus causing damages to high temperature and high pressure measuring and controlling parts, high pressure oil cylinders and sensors on the base of the triaxial chamber as well as personal injuries to installers. Currently, manual operations are extremely difficult, risky and inefficient, constituting a big difficulty and challenge in the rock mechanics tests in deep earth environment. Whereas, the equipment manufacturer MTS fails to provide an effective solution or product, thus there is still great problem in the installation, dismounting, commissioning and maintenance of the high temperature and high pressure force sensor in the MTS system.

SUMMARY

The technical problem to be solved by the invention is to provide a rock mechanics response test system for simulated complex deep earth environment.

The technical solution applied in the invention is a rock mechanics response test system for simulated complex deep earth environment, comprising an MTS triaxial test machine and a control system connected therewith; the MTS triaxial test machine is composed of a rigid column, a high temperature and high pressure triaxial chamber and a triaxial chamber base; the high temperature and high pressure triaxial chamber and the triaxial chamber base are arranged on the rigid column; the high temperature and high pressure triaxial chamber is vertically opposite to the triaxial chamber base; a central axis of the high temperature and high pressure triaxial chamber coincides with a central axis of the triaxial chamber base; the triaxial chamber base is provided with an oil hydraulic pump; the high temperature and high pressure triaxial chamber is equipped with a heater outside; the control system comprises a workstation for data processing and a manual controller for controlling the workstation and a master controller; the workstation and the manual controller are synchronously connected with the master controller, the master controller is configured to control a confining pressure control system, a temperature control system, a seepage control system and a loading control system; the loading control system is configured to control an oil source system, the confining pressure control system is configured to control a confining pressure pump, and the seepage control system is configured to control a hydraulic pump; and rock mechanics response test system for simulated complex deep earth environment is characterized in that the MTS triaxial test machine also comprises an MTS triaxial sensor aligning and mounting device and a bearing system for rock mechanics tests in simulated deep earth environment; and the MTS triaxial sensor aligning and mounting device is arranged above the bearing system for rock mechanics tests in simulated deep earth environment.

The bearing system for the rock mechanics tests in the simulated complex deep earth environments comprises a base, a lifting seat and an intermediate connecting seat arranged between the base and the lifting seat; a hydraulic assembly is arranged between the base and the intermediate connecting seat; a piston end of the hydraulic assembly is connected with a bottom of the intermediate connecting seat, and the other end thereof is connected with the base; the intermediate connecting seat is connected with the lifting seat by means of a group of connecting rods; the lifting seat comprises a base plate and a side wall arranged on the base plate; the side wall and the base plate are enclosed to form a receiving groove with an upward opening for housing an MTS high temperature and high pressure sensor; an operating channel running through the base plate is arranged at a center of the base plate along an axial direction thereof; a limiting device is arranged on the side wall of the lifting seat for preventing the MTS high temperature and high pressure sensor from disengaging from a support disk; a through hole fitting a central alignment pin of an MTS hydraulic servo table is arranged on the base; the MTS triaxial sensor aligning and mounting device comprises a master rod for aligning with a central threaded hole and a secondary rod for aligning with a limiting hole; the master rod and the secondary rod are kept in a horizontal level, with a center-to-center distance therebetween equal to a center-to-center distance between the central threaded hole and the peripheral limiting hole; a stop sleeve is sleeved on the master rod to keep the master rod and the secondary rod in a horizontal level and the center-to-center distance between the master rod and the secondary rod equal to the center-to-center distance between the central threaded hole and the peripheral limiting hole; the stop sleeve is cylindrical and has two corbel structures, i.e., an upper corbel and a lower corbel; an end round hole axis of the upper corbel coincides with an end round hole axis of the lower corbel; the end round axes of the upper corbel and the lower corbel are parallel to the axis of the master rod; a circular magnetic block is fixed on the secondary rod body and is configured for adsorbing a hole alignment sleeve that is sleeved on the secondary rod body; the hole alignment sleeve has a same inner diameter as a steel pin in a limiting bole arranged on the sensor and is marked with a first scale line and a second scale line; the first scale line represents a relaxed or aligned state, while the second line represents a contracted and aligning state; the secondary rod comprises a secondary rod head body and a secondary rod body; and the secondary rod head body is connected with the secondary rods body by means of a spring.

Further, the limiting device comprises a group of stop screws disposed uniformly around the side wall of the lifting seat; and the stop screws pass through the side wall of the lifting seat along the radial direction of the lifting seat and are in threaded connection with the lifting seat.

Further, the piston end of the hydraulic cylinder is connected to a center of the intermediate connecting seat.

Further, an elbowed support member is arranged at both sides of the hydraulic assembly respectively; the two elbowed support members are symmetrical about a center line of the hydraulic cylinder; one end of the elbowed support member is hinged with the base, and the other end of the elbowed support member is hinged with the intermediate connecting seat; and the elbowed support members are hinged by means of two transmission rods.

Further, the two elbowed support members are enclosed to form a parallelogram structure.

Further, the hydraulic assembly comprises a support seat and the hydraulic cylinder; the support seat is provided with a cavity running through the bottom thereof along the axial direction thereof and a through hole along the axial direction thereof from the cavity to a top end of the support seat, and the cavity is coaxial with the through hole; and a cylinder body of the hydraulic cylinder is arranged in the cavity, and a piston rod thereof is connected with the bottom of the intermediate connecting seat by the through hole.

Further, the support seat is configured as a circular truncated cone.

Further, the secondary rod body and the upper corbel are fixed by means of a horizontal cylindrical pin.

Further, the master rod is composed of a threaded rod, a smooth cylinder and a smooth cylinder with a horizontal hole; the threaded rod is capable of rotating into a bottom threaded hole of a solid rigid column at a lower end of the MTS triaxial chamber; the smooth cylinder is arranged in the middle of the master rod; and the stop sleeve is sleeved on the smooth cylinder.

Further, a horizontal cylindrical short rod is arranged on the master rod, the horizontal cylindrical short rod runs through a round hole configured on the smooth cylinder with a horizontal hole of the master rod. After the horizontal cylindrical short rod is inserted into the round rod configured on the smooth cylinder with the horizontal hole, the master rod is capable of being rotated to rotate the threaded rod into the bottom threaded hole of the solid rigid column at the lower end of the MTS triaxial chamber.

Further, the secondary rod body of the secondary rod is a cylindrical rod, the secondary rod head body arranged at the upper part of the secondary rod is provided with a rolling steel ball 10, and an outer diameter of the secondary rod head body is lower than an inner diameter of the peripheral limiting hole.

Further, the spring is a cylindrical compression spring.

The invention has the following beneficial effects: the bearing system is time-saving and energy-saving in dismounting and installation of the force sensor compared with the manual operations; the bearing system is capable of providing stable and powerful support for the force sensor and applying a certain pulling force to the force sensor after the force sensor is locked in position by the limiting device, thus overcoming the difficulty of dismounting the force sensor in the presence of oil suction; the bearing system is capable of implementing steady lifting by the hydraulic assembly, avoiding damage of the sensor caused by vibration and other factors; and the reliable limiting structure is capable of preventing the force sensor from fall and damage in case of accidents. Meanwhile, the hole alignment of the force sensor and the solid rigid column is simple and reliable. After the secondary rod is aligned with the correct hole, the central hole and the limiting hole of the force center and the solid rigid column are aligned by lowering the hole alignment sleeve, inserting a lower part of the master rod into the center hole of the force sensor and rotating the force sensor to sheathe the hole sleeve on the limiting pin of the force sensor.

Marks in the figures: base 1A, though hole 11A, intermediate connecting seat 2A, lifting seat 3A, base plate 31A, side wall 32A, receiving groove 33A, operating channel 34A, stop screw 35A, hydraulic assembly 4A, support seat 41A, cavity 411A, though hole 412A, hydraulic cylinder 42A, connecting rod 5A, elbowed support member 6A, transmission rod 61A, MTS hydraulic servo table 7A, force sensor 8A, horizontal cylindrical short rod 1B, master rod 2B, stop sleeve 3B, secondary rod body 4B, hole alignment sleeve 5B, circular magnetic block 6B, horizontal cylindrical pin 7B, spring 8B, secondary rod head body 9B, rolling steel ball 10B, upper scale line 11B, lower scale line 12B, solid rigid column 13B, secondary rod 14B, upper corbel 15B, lower corbel 16B, threaded rod 17B, smooth cylinder 18B, smooth cylinder 19B with a horizontal hole, secondary rod body 20B, MTS triaxial sensor aligning and mounting device 2, and bearing system for rock mechanics tests in simulated deep earth environment 1.

DETAILED DESCRIPTION OF THE EMBODIMENTS

Figure 1:
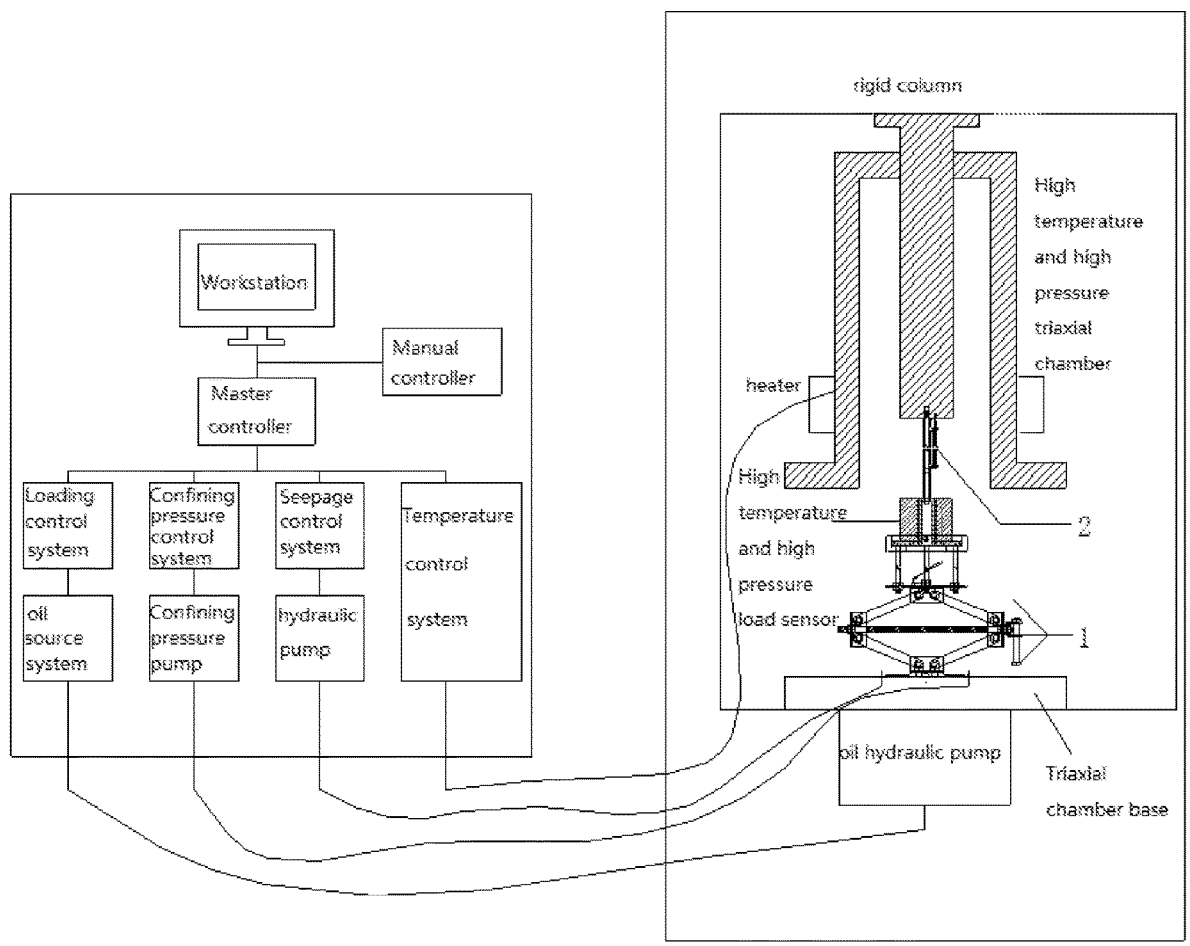
FIG. 1 is a structural diagram of the rock mechanics response test system for simulated complex deep earth environment.

The invention will be further described in combination with drawings and embodiments:

As shown in FIG. 1:

A rock mechanics response test system for simulated complex deep earth environment comprises an MTS triaxial test machine and a control system connected therewith; the MTS triaxial test machine is composed of a rigid column, a high temperature and high pressure triaxial chamber and a triaxial chamber base; the high temperature and high pressure triaxial chamber and the triaxial chamber base are arranged on the rigid column, the high temperature and high pressure triaxial chamber is vertically opposite to the triaxial chamber base, a central axis of the high temperature and high pressure triaxial chamber coincides with a central axis of the triaxial chamber base, the triaxial chamber base is provided with an oil hydraulic pump, and the high temperature and high pressure triaxial chamber is equipped with a heater outside; the control system comprises a workstation for data processing and a manual controller for controlling the workstation and a master controller; and the workstation and the manual controller are synchronously connected with the master controller, the master controller is configured to control a confining pressure control system, a temperature control system, a seepage control system and a loading control system, the loading control system is configured to control an oil source system, the confining pressure control system is configured to control a confining pressure pump, and the seepage control system is configured to control an hydraulic pump. The MTS triaxial test machine also comprises an MTS triaxial sensor aligning and mounting device 2 and a bearing system for rock mechanics tests in simulated deep earth environment 1; and the triaxial sensor alignment device 2 is arranged above the bearing system for rock mechanics tests in simulated deep earth environment 1.

Figure 2:
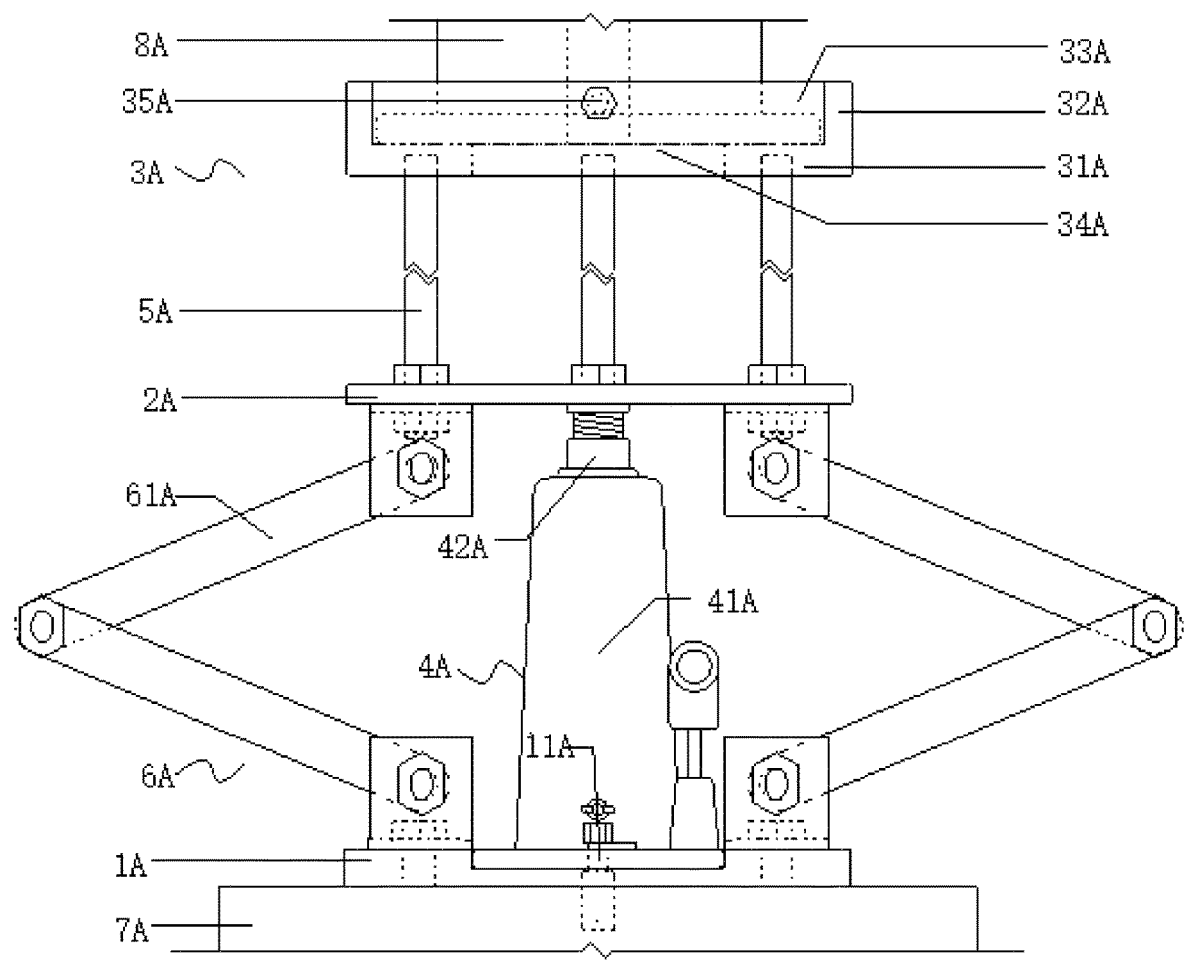
FIG. 2 is a structural diagram of the bearing system for rock mechanics tests in simulated deep earth environment.

As shown in FIG. 2, the bearing system for rock mechanics tests in simulated deep earth environment comprises a base 1A, a lifting seat 3A, and an intermediate connecting seat 2A arranged between the base 1A and the lifting seat 3A; a hydraulic assembly 4A is arranged between the base 1A and the intermediate connecting seat 2A; a piston end of the hydraulic assembly 4A is connected with a bottom of the intermediate connecting seat 2A, and the other end thereof is connected with the base 1A; the intermediate connecting seat 2A is connected with the lifting seat 3A by means of a group of connecting rods 5A; the lifting seat 3A comprises a base plate 31A and a side wall 32A arranged on the base plate 31A; the side wall 32A and the base plate 31A are enclosed to form a receiving groove 33A with an upward opening for housing an MTS high temperature and high pressure sensor; an operating channel 34A running through the base plate 31A is arranged at a center of the base plate 31A of the lifting seat 3A along an axial direction thereof; a limiting device is arranged on the side wall 32A of the lifting seat 3A for preventing the MTS high temperature and high pressure sensor from disengaging from a support plate 12A; and a though hole 11A fitting a central alignment pin of an MTS hydraulic servo table 7A is arranged on the base 1A.

According to the invention, the lifting seat 3A is used for lifting a force sensor 8A, and the lifting seat 3A is supported on the intermediate connecting seat 2A. The intermediate connecting seat 2A is supported on a top end of the hydraulic assembly 4A. The force sensor is lifted to a mounting position by jacking up the lifting seat 3A through extension of a piston rod of the hydraulic assembly 4A, or the force sensor is removed from a rigid column in a triaxial chamber by pulling back the lifting seat 3A through retraction of the piston rod of the hydraulic assembly 4A. The side wall 32A and the base plate 31A of the lifting base 3A are enclosed to form a receiving groove 33A with an upward opening for housing the force sensor 8A. The force sensor 8A is axially limited by the side wall 32A, bottom limited by the base plate 31A and locked by the limiting device to prevent the force sensor 8A from moving in the receiving groove 33A. An operating channel 34A runs through the base plate 31A so that operators install and dismount bolts through the operating channel 34A below, thus avoiding the risk of working at heights.

The bearing system is time-saving and energy-saving in dismounting and installation of the force sensor compared with manual support; the bearing system is capable of providing stable and powerful support for the force sensor and applying a certain pulling force to the force sensor 8A after the force sensor is locked in position by the limiting device, thus overcoming the difficulty of dismounting the force sensor in the presence of oil suction; the bearing system is capable of implementing steady lifting by the hydraulic assembly 4A, avoiding damage of the sensor caused by vibration and other factors; and the reliable limiting structure is capable of preventing the force sensor from fall and damage in case of accidents.

Figure 3:
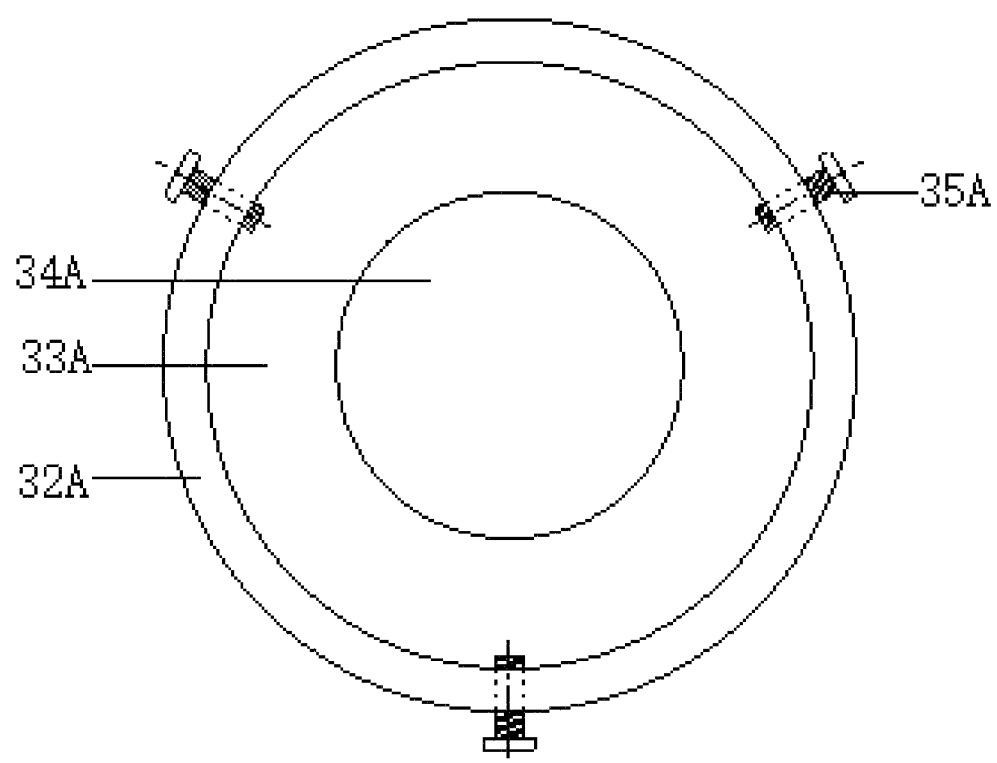
FIG. 3 is a top view of the lifting seat.

Preferably, as shown in FIGS. 2 and 3, the limiting device comprises a group of stop screws 35A disposed uniformly around the side wall 32A of the lifting seat 3A. The stop screws 35A pass through the side wall 32A of the lifting seat 3A along the radial direction of the lifting seat 3A and are in threaded connection with the lifting seat 3A.

Preferably, the piston end of the hydraulic assembly 4A is connected to the center of the intermediate connecting seat 2A to maintain levelness of the intermediate connecting seat 2A and the lifting seat 3A so as to avoid titling of the force sensor 8A.

Certainly, the intermediate connecting seat 2A is capable of being supported solely by the hydraulic assembly 4A; but lack of sufficient support points is not conductive to supporting stability; therefore, an elbowed support member 6A is arranged at both sides of the hydraulic assembly 4A preferably; the two elbowed support members 6A are symmetrical about a center line of a hydraulic cylinder 42A; one end of the elbowed support member 6A is hinged with the base 1A, and the other end thereof is hinged with the intermediate connecting seat 2A; and the elbowed support members 6A are hinged by means of two transmission rods 61A. The hydraulic cylinder 42A and the elbowed support members 6A are capable of providing strong support and high stability.

The two elbowed support members 6A is capable of being arranged in an X shape; but the elbowed support members 6A are pressed in the direction of the hydraulic assembly 4A at compression, which is prone to causing interference and shortening compression distance; therefore, the two elbowed support members 6A are preferably enclosed to form a parallelogram structure.

Figure 4:
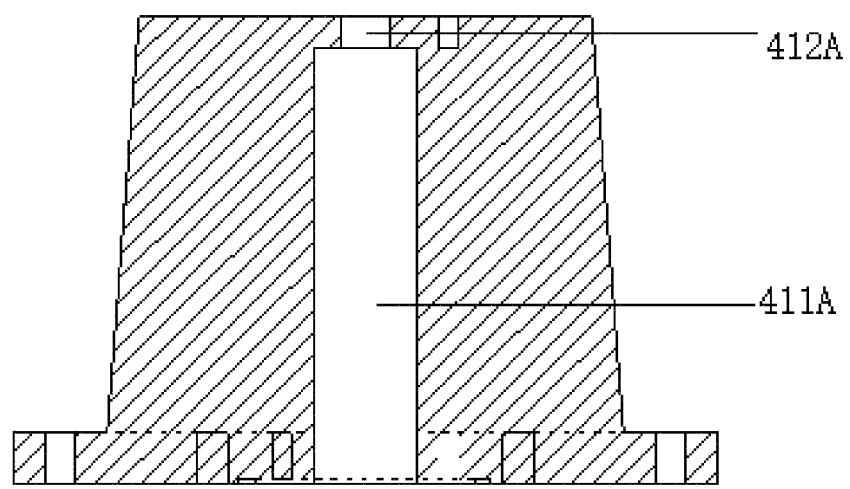
FIG. 4 is a sectional view of the support seat.

The hydraulic assembly 4A is capable of solely comprising a hydraulic cylinder; but in order to increase rigidity of the hydraulic cylinder, the hydraulic assembly 4A comprises a support seat 41A and a hydraulic cylinder 42A preferably, as shown in FIGS. 3 and 4; the support seat 41A is provided with a cavity 411A running through a bottom thereof along an axial direction thereof and a through hole 412A along an axial direction from the cavity 411A to a top end of the support seat 41A, and the cavity 411A is coaxial with the through hole 412A; a cylinder body of the hydraulic cylinder 42A is arranged in the cavity 411A, and a piston rod passes through the through hole 412A and is connected with the bottom of the intermediate connecting seat 2A. Extension and retraction of the piston rod is adjusted via the through hole 412A, thus improving movement stability and preventing tilting of the intermediate connecting seat 2A and the lifting seat 3A thereon. In addition, there are additional support points for the piston rod, which improves rigidity and expands service life.

Preferably, the support seat 41A is configured as a circular truncated cone.

Figure 5:
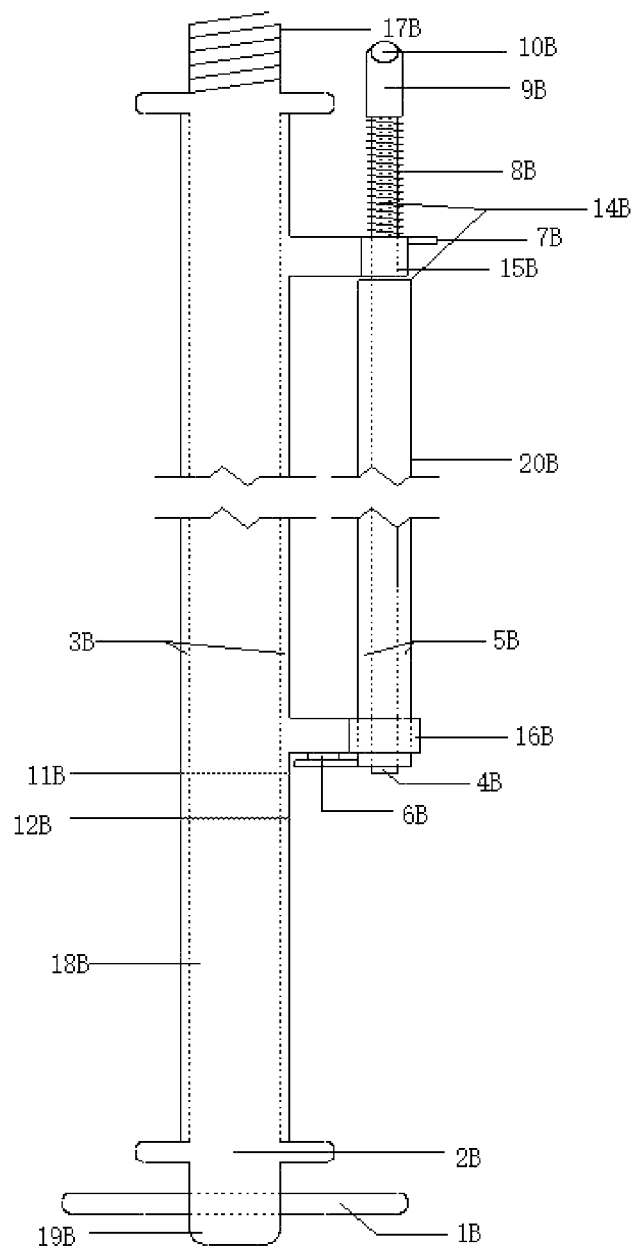
FIG. 5 is a structural diagram of the MTS triaxial sensor aligning and mounting device.

As shown in FIG. 5, the MTS triaxial sensor aligning and mounting device comprises a master rod 2B, a secondary rod 14B, a stop sleeve 3B, a hole alignment sleeve 5B and relevant accessory members; the master rod 2B is used for aligning with a central threaded hole, and the secondary rod 14B is used for aligning with a limiting hole; the cylindrical stop sleeve 3B is sleeved on the master rod 2B to keep the master rod 2B and the secondary rod 14B in a horizontal level and a center-to-center distance therebetween equal to a center-to-center distance between the central threaded hole and the peripheral limiting hole; rigid connection between the master rod 2B and the secondary rod 14 keeps the master rod 2B and the secondary rod 14B in a horizontal level and the center-to-center distance between the master rod 2B and the secondary rod 14B equal to the center-to-center distance between the central threaded hole and the peripheral limiting hole; the central threaded hole and the peripheral limiting hole are arranged on the MTS test machine; two corbel structures are arranged on the stop sleeve 3B, i.e., an upper corbel 15B and a lower corbel 16B; an end round hole axis of the upper corbel 15B coincides with an end round hole axis of the lower corbel 16B; and the end round hole axes of the upper corbel 15B and the lower corbel 16B are parallel to the axis of the master rod 2B.

A circular magnetic block 6B is fixed on the secondary rod 14B and configured to adsorb a hole alignment sleeve 5B sheathed on the secondary rod 14B; the hole alignment sleeve 5B has a same inner diameter as a steel pin in a limiting bole arranged on the sensor and is marked with a first scale line and a second scale line; and the first scale line represents a relaxed or aligned state, while the second line represents a contracted or aligning state.

The master rod 2B is composed of a threaded rod 17B, a smooth cylinder 18B and a smooth cylinder 19B with a horizontal hole; the threaded rod 17B is capable of rotating into a bottom threaded hole of a solid rigid column 13B at a lower end of the MTS triaxial chamber, and the smooth cylinder is arranged in the middle of the master rod 2B, and the stop sleeve 3B is sleeved on the smooth cylinder 18B.

A horizontal cylindrical short rod 1B is arranged on the master rod 2B. The horizontal cylindrical short rod 1B passes through a round hole disposed on the smooth cylinder 19B with a horizontal hole of the master rod 2B; and after the horizontal cylindrical short rod 1B is inserted into the round hole disposed on the smooth cylinder 19B with the horizontal hole, the master rod 2B is capable of being rotated to rotate the threaded rod to 17B into the bottom threaded hole at the lower end of the solid rigid column 13B of the MTS triaxial chamber.

The secondary rod 14B is composed of a secondary rod head body 9B and a secondary rod body 20B; the secondary rod body 20B is a cylindrical rod; the secondary rod head body 9B is connected with the secondary rod body 20B by means of a spring 8B; the secondary rod head body 9B arranged at an upper part of the secondary rod 14B is provided with a rolling steel ball 10B; an outer diameter of the secondary rod head body 9B is lower than the inner diameter of the peripheral limiting hole; the secondary rod head body 9B is capable of inserting into the limiting hole; the secondary rod body 20B is fixed on the upper corbel 15B by means of a horizontal cylindrical pin 7B; the body of the secondary rod 14B is cylindrical; the secondary rod head body 9B arranged at the upper part of the secondary rod 14B is provided with a rolling steel ball 10B; an outer diameter of the secondary rod head body 9B is lower than the inner diameter of the peripheral limiting hole; and the secondary rod head body 9B is capable of inserting into the limiting hole.

A horizontal cylindrical short rod 1B is arranged on the master rod 2B. The horizontal cylindrical short rod 1B passes through the round hole disposed on the smooth cylinder 19B with the horizontal hole of the master rod 2B; and after the horizontal cylindrical short rod 1B is inserted into the round hole disposed on the smooth cylinder 19B with the horizontal hole, the master rod 2B is capable of being rotated to rotate the threaded rod to 17B into the bottom threaded hole at the lower end of the solid rigid column 13B of the MTS triaxial chamber; and the horizontal cylindrical short rod 1B provides a point of external force application when the threaded rod 17B arranged on the master rod 2B rotates into the threaded hole.

The stop sleeve 3B is cylindrical and has two corbel structures, i.e., an upper corbel 15B and a lower corbel 16B; an end round hole axis of the upper corbel 15B coincides with an end round hole axis of the lower corbel 16B; and the end round axes of the upper corbel 15B and the lower corbel 16B are parallel to the axis of the master rod 2B.

The master rod 2B and the secondary rod 14B are kept in a horizontal level, with the center-to-center distance therebetween equal to the center-to-center distance between the central threaded hole and the peripheral limiting hole; the end round hole axis of the upper corbel 15B coincides with the end round hole axis of the lower corbel 16B; and the end round axes of the upper corbel 15B and the lower corbel 16B are parallel to the axis of the master rod 2B.

The secondary rod 14B is composed of a secondary rod head body 9B and a secondary rod body 20B; the secondary rod head body 9B is provided with a rolling steel ball 10B; an outer diameter of the secondary rod head body 9B is lower than an inner diameter of the peripheral limiting hole; and a horizontal cylindrical pin 7B is arranged on the secondary rod body 20B.

Preferably, the spring 8B is an elastic rigid connector such as a spring bar.

Figure 6:
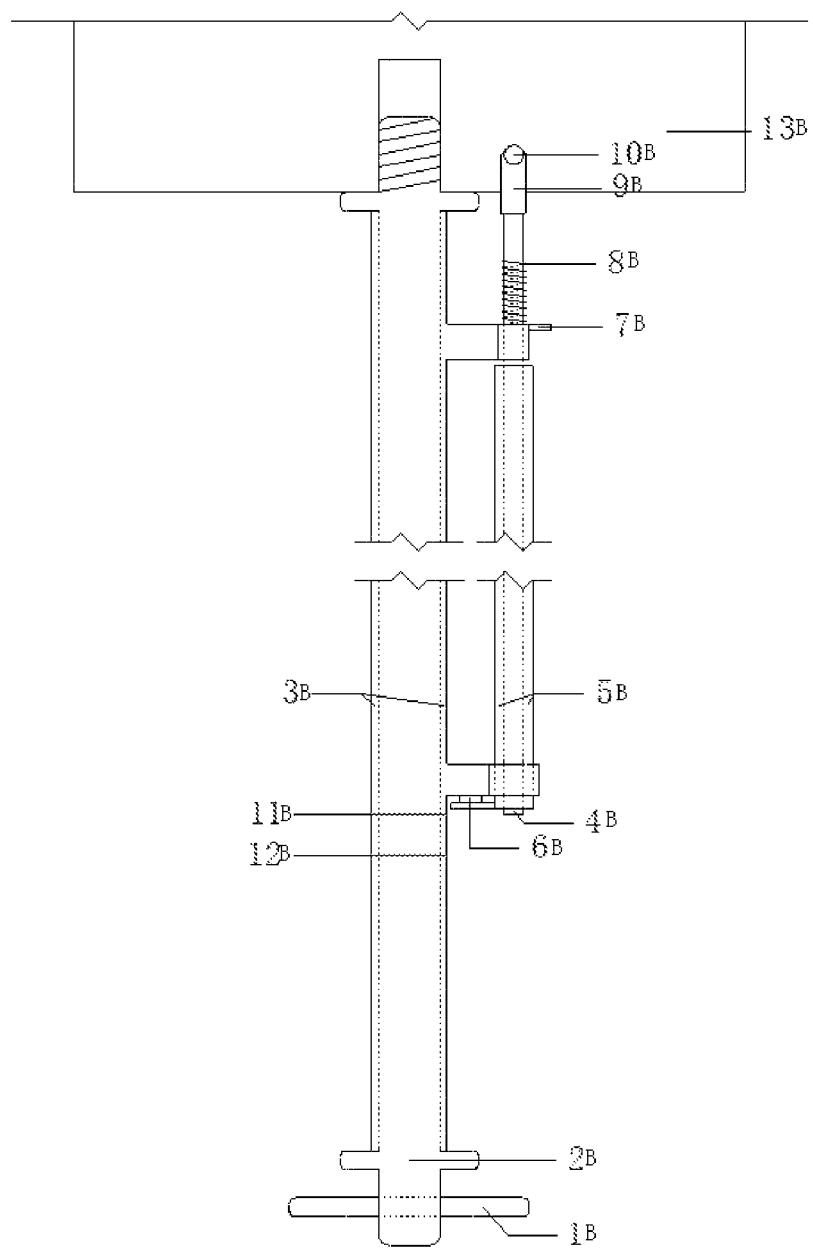
FIG. 6 shows a relaxed or aligned state of the accurate limiting hole alignment device.

FIG. 6 shows a relaxed or aligned state of the accurate limiting hole alignment device. The lower end of the secondary rod 14B is located at an upper scale line 11B, the term "relaxed" means that the secondary rod 14B is retractable freely and the term "aligned" means that the secondary rod body 9B is inserted into the limiting hole at the lower end of the solid rigid column 13B. At the relaxed state, the spring 8B is free and the length thereof is equal to original length thereof; and at the aligned state, the spring 8B is subject to deformation but is not locked in position, thus the length thereof is smaller than the original length thereof.

Figure 7:
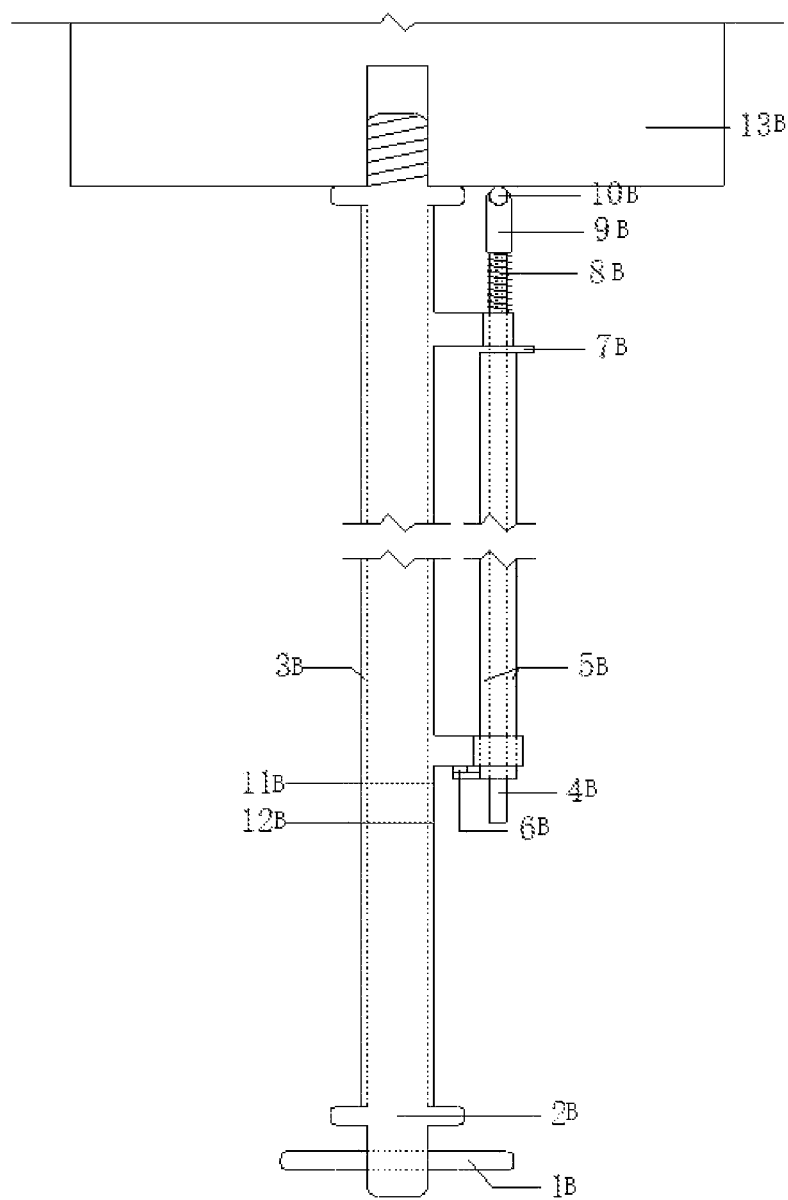
FIG. 7 shows a contracted or aligning state of the accurate limiting hole alignment device.

FIG. 7 shows a contracted or aligning state of the accurate limiting hole alignment device. The lower end of the secondary rod 14B is located at the lower scale line 12B, the term "contracted" means that the secondary rod is contracted for exiting from the limiting hole at the lower end of the solid rigid column 13B upon alignment, and the term "aligning" means that the secondary rod is seeking to align with the limiting hole during rotation of the sleeve after the threaded rod of the master rod enters the central threaded hole at the lower end of the solid rigid column 13B. At the contracted state, the spring 8B is subject to elastic deformation that shortens the length thereof, thus the length of the spring 8B is smaller than the original length thereof at this time, and the spring is capable of being pushed out of the limiting hole; at the aligning state, the spring 8B is locked in position and is subject to the maximum elastic deformation, thus the length of the spring 8B is smaller than the original length thereof; and the maximum deformation maintained in the aligning process of the spring 8B is conductive to reducing torsional deformation of the spring 8B, decreasing displacement of the secondary rod head body 9B in the aligning process and improving aligning accuracy.

What is claimed is:

1. A rock mechanics response test system for a simulated complex deep earth environment, comprising an MTS triaxial test machine and a control system connected with the MTS triaxial test machine;
   wherein the MTS triaxial test machine comprises a rigid column, a high temperature and high pressure triaxial chamber, and a triaxial chamber base;
   the high temperature and high pressure triaxial chamber and the triaxial chamber base are arranged on the rigid column, and the high temperature and high pressure triaxial chamber is vertically opposite to the triaxial chamber base;
   a central axis of the high temperature and high pressure triaxial chamber coincides with a central axis of the triaxial chamber base, the triaxial chamber base is provided with an oil hydraulic pump, and the high temperature and high pressure triaxial chamber is equipped with a heater outside;
   the control system comprises a workstation for data processing and a manual controller for controlling the workstation and a master controller;
   the workstation and the manual controller are synchronously connected with the master controller, the master controller is configured to control a confining pressure control system, a temperature control system, a seepage control system, and a loading control system;
   the loading control system is configured to control an oil source system, the confining pressure control system is configured to control a confining pressure pump, and the seepage control system is configured to control a hydraulic pump; and
   the MTS triaxial test machine further comprises an MTS triaxial sensor aligning and mounting device and a bearing system for a rock mechanics test in the simulated complex deep earth environment, and the MTS triaxial sensor aligning and mounting device is arranged above the bearing system.

2. The rock mechanics response test system for the simulated complex deep earth environment according to claim 1,
   wherein the bearing system comprises a base, a lifting seat, and an intermediate connecting seat arranged between the base and the lifting seat, a hydraulic assembly is arranged between the base and the intermediate connecting seat, a piston end of the hydraulic assembly is connected with a bottom of the intermediate connecting seat, and the other end of the hydraulic assembly is connected with the base;
   the intermediate connecting seat is connected with the lifting seat by means of a group of connecting rods;
   the lifting seat comprises a base plate and a side wall arranged on the base plate, the base plate and the side wall are enclosed to form a receiving groove with an upward opening for housing an MTS triaxial force sensor, an operating channel running through the base plate is arranged at a center of the base plate of the lifting seat along an axial direction of the base plate, and a limiting device is arranged on a side wall of the lifting seat for preventing the MTS triaxial force sensor from disengaging from a support disk;
   a through hole fitting a central alignment pin of an MTS hydraulic servo table is arranged on the base;
   the limiting device comprises a group of stop screws disposed uniformly around the side wall of the lifting seat, the group of stop screws pass through the side wall of the lifting seat along a radial direction of the lifting seat and are in a threaded connection with the lifting seat; and
   the MTS triaxial sensor aligning and mounting device comprises a master rod for aligning with a central threaded hole and a secondary rod for aligning with a peripheral limiting hole; the master rod and the secondary rod are kept in a horizontal level, with a center-to-center distance between the master rod and the secondary rod equal to a center-to-center distance between the central threaded hole and the peripheral limiting hole; a stop sleeve is sleeved on the master rod to keep the master rod and the secondary rod in the horizontal level and make the center-to-center distance between the master rod and the secondary rod equal to the center-to-center distance between the central threaded hole and the peripheral limiting hole; the stop sleeve is cylindrical; an upper corbel and a lower corbel are arranged on the stop sleeve; an end round hole axis of the upper corbel coincides with an end round hole axis of the lower corbel; the end round hole axes of the upper corbel and the lower corbel are parallel to an axis of the master rod; a circular magnetic block is fixed on the secondary rod body, the circular magnetic block is configured to adsorb a hole alignment sleeve sleeved on the secondary rod body; the hole alignment sleeve has a same inner diameter as a steel pin in a peripheral limiting hole arranged on the MTS triaxial force sensor; the hole alignment sleeve is marked with a first scale line and a second scale line; the first scale line corresponds to a relaxed or aligned state, and the second scale line corresponds to a contracted and aligning state; the secondary rod comprises a secondary rod head body and the secondary rod body, the secondary rod body and the upper corbel are fixed by means of a horizontal cylindrical pin; and
   the secondary rod head body is connected with the secondary rod body by means of a spring.

3. The rock mechanics response test system for the simulated complex deep earth environment according claim 2,
  wherein a piston end of a hydraulic cylinder is connected to a center of the intermediate connecting seat; and
  two elbowed support members are arranged at two sides of the hydraulic assembly; the two elbowed support members are symmetrical about a center line of the hydraulic cylinder; a first end of each elbowed support member is hinged with the base, and a second end of each elbowed support member is hinged with the intermediate connecting seat; and the two elbowed support members are hinged by means of two transmission rods.

4. The rock mechanics response test system for the simulated complex deep earth environment according claim 3, wherein the two elbowed support members are enclosed to form a parallelogram structure.

5. The rock mechanics response test system for the simulated complex deep earth environment according claim 2,
  wherein the hydraulic assembly comprises a support seat and the hydraulic cylinder;
  the support seat is provided with a cavity running through a bottom of the support seat along an axial direction of the support seat and a through hole along the axial direction of the support seat from the cavity to a top end of the support seat, and the cavity is coaxial with the through hole; and
  a cylinder body of the hydraulic cylinder is arranged in the cavity, and a piston rod of the hydraulic cylinder is connected with the bottom of the intermediate connecting seat by the through hole.

6. The rock mechanics response test system for the simulated complex deep earth environment according to claim 5, wherein the support seat is configured as a circular truncated cone.

7. The rock mechanics response test system for the simulated complex deep earth environment according to claim 2,
  wherein the master rod comprises a threaded rod, a first smooth cylinder, and a second smooth cylinder with a horizontal hole;
  the threaded rod is capable of rotating into a bottom threaded hole of a solid rigid column of a MTS triaxial chamber, the first smooth cylinder is arranged in a middle of the master rod, and the stop sleeve is sleeved on the first smooth cylinder;
  a horizontal cylindrical short rod is arranged on the master rod, the horizontal cylindrical short rod runs through a round hole configured on the second smooth cylinder of the master rod;
  after the horizontal cylindrical short rod is inserted into the round hole configured on the second smooth cylinder, the master rod is capable of being rotated to rotate the threaded rod into the bottom threaded hole of the solid rigid column at a lower end of the MTS triaxial chamber;
  the secondary rod body of the secondary rod is a cylindrical rod;
  a rolling steel ball is arranged on the secondary rod head body of the secondary rod; and
  an outer diameter of the secondary rod head body is smaller than an inner diameter of the peripheral limiting hole.

8. The rock mechanics response test system for the simulated complex deep earth environment according to claim 2, wherein the spring is a cylindrical compression spring.

* * * * *